No. 823,781. PATENTED JUNE 19, 1906.
J. G. HODGSON.
CAN LOADING AND COUNTING MACHINE.
APPLICATION FILED MAR. 6, 1905.
2 SHEETS—SHEET 1.
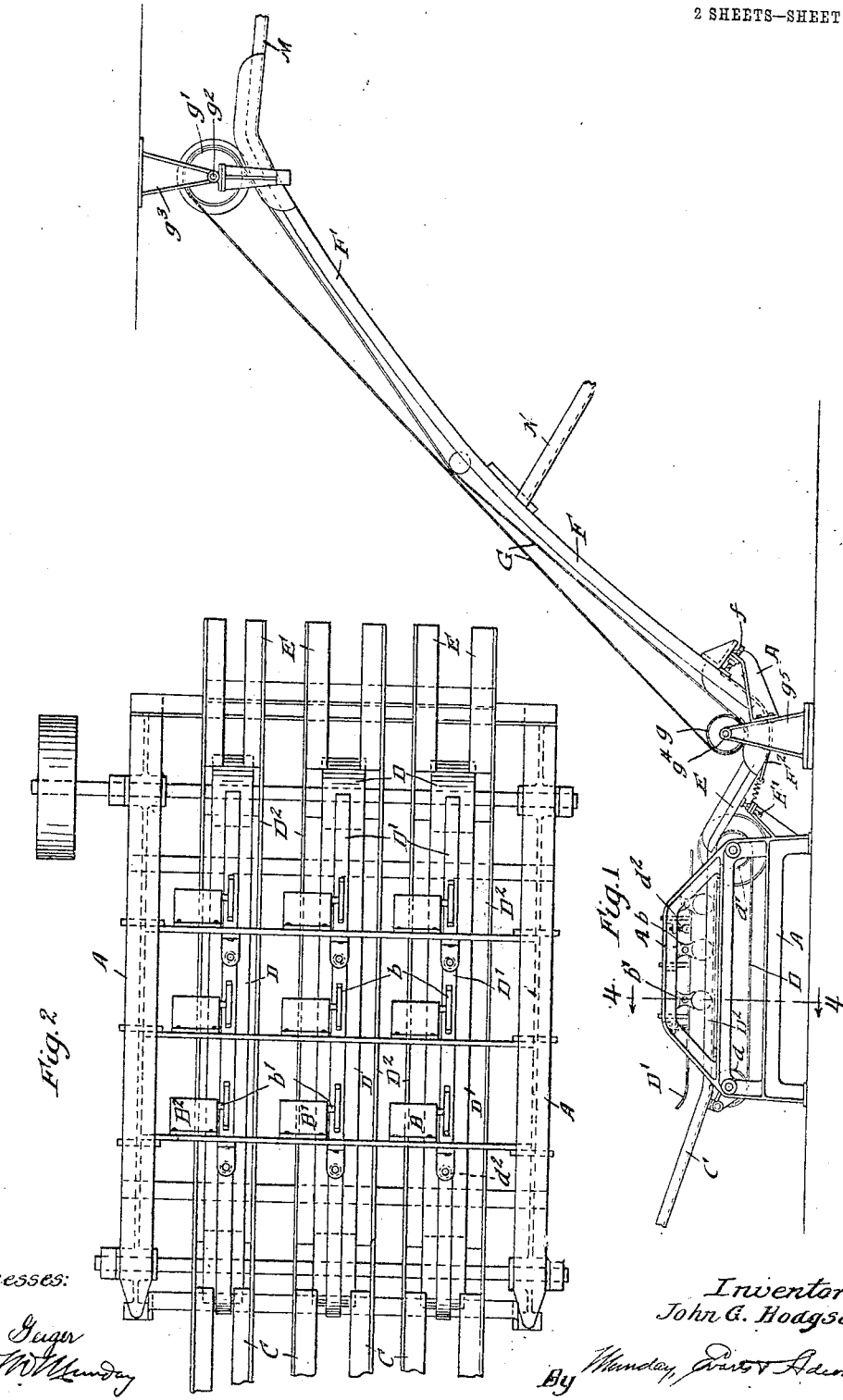
Witnesses:
Inventor:
John G. Hodgson
By Munday, Evarts & Adcock
Attorneys

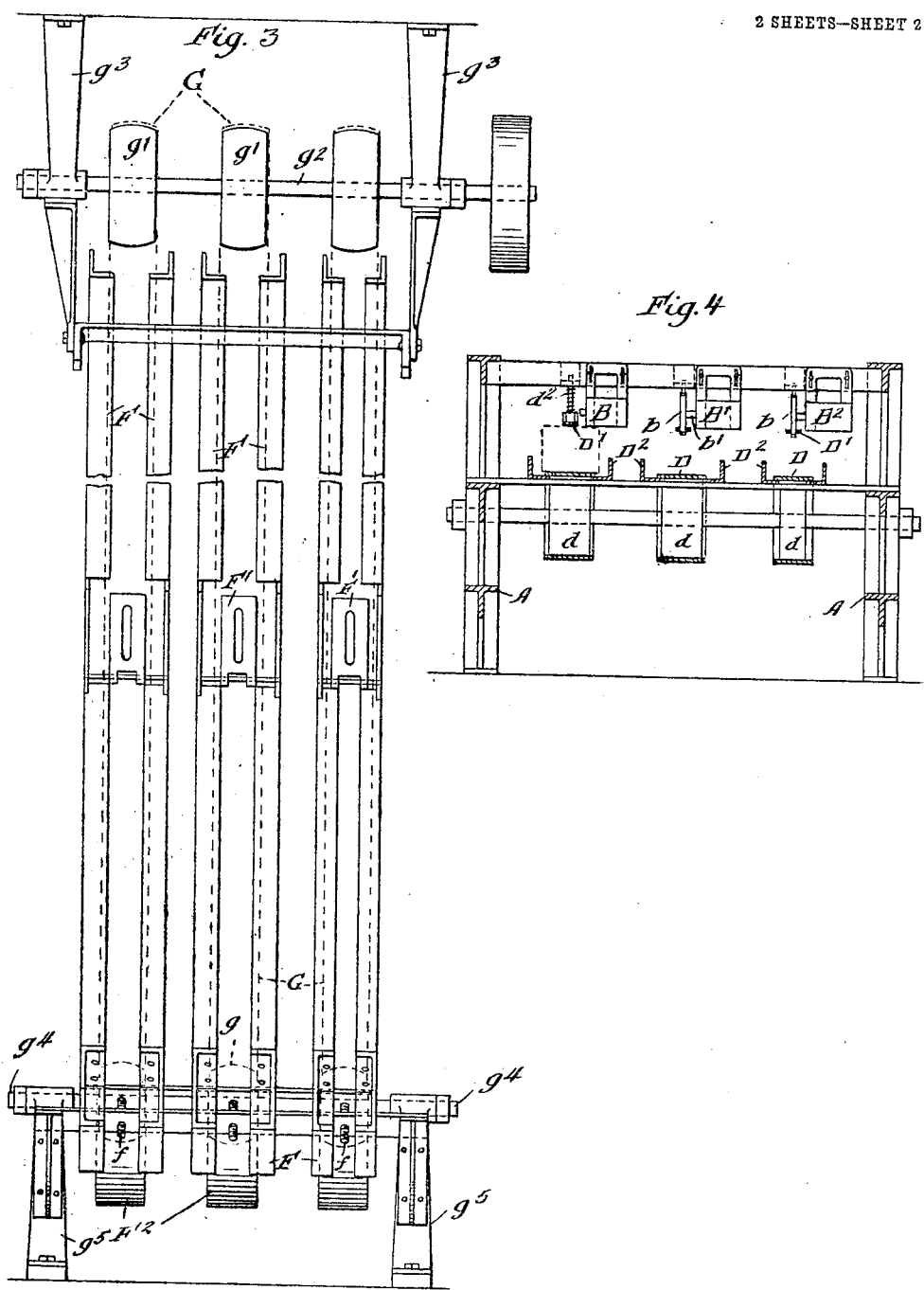

UNITED STATES PATENT OFFICE.

JOHN G. HODGSON, OF MAYWOOD, ILLINOIS, ASSIGNOR TO AMERICAN CAN COMPANY, OF NEW YORK, N. Y., A CORPORATION OF NEW JERSEY.

CAN LOADING AND COUNTING MACHINE.

No. 823,781.   Specification of Letters Patent.   Patented June 19, 1906.

Application filed March 6, 1905. Serial No. 248,785.

*To all whom it may concern:*

Be it known that I, JOHN G. HODGSON, a citizen of the United States, residing in Maywood, in the county of Cook and State of Illinois, have invented a new and useful Improvement in Can Loading and Counting Machines, of which the following is a specification.

My invention relates to mechanism or apparatus for counting and loading cans.

My invention consists in the novel construction of parts and devices and in the novel combinations of parts and devices herein shown or described, and specified in the claims.

In the accompanying drawings, forming a part of this specification, Figure 1 is a side elevation of a machine or apparatus embodying my invention. Fig. 2 is a partial plan view. Fig. 3 is a front elevation, and Fig. 4 is a vertical section on line 4 4 of Fig. 1.

In the drawings, A represents the frame of the machine, which may be of any suitable form or construction to give support to the other parts.

B B B, B' B' B', and B² B² B² represent three sets or series of can-counters, each having a spider or counter-wheel $b$ on its counter-shaft $b'$, arranged in the path of the cans to engage the same as they are rolled or conveyed along.

C C C represent a plurality of parallel can-runways by which the cans are delivered to my counting and loading machine.

D D D are a plurality of endless can rolling or conveying belts traveling on pulleys $d\ d'$ and operating, in connection with the coöperating guides D' D', to convey or roll the cans past the counter-wheels or spiders.

E E E represent a plurality of inclined runways or chutes for delivering the cans from the counter mechanism to the can loader or elevating runways F. The elevating or loader can-runways F are curved or cambered upward or toward the can-rolling belts G, by which the cans are rolled up along the runways F. The curve or camber of the runway toward the belt G serves to cause the cans to be gripped and rolled by the belt up the runway. The can-elevating belt G travels on pulleys $g\ g'$, the shaft $g^2$ of the upper belt being preferably journaled on brackets $g^3$, attached to the ceiling, while the shaft $g^4$ of the lower pulley $g$ is journaled on stands $g^5$, secured to the floor. The elevating-runway G communicates at its upper end with the discharge-chute M for delivering the cans into the car or other vehicle. The curved or cambered loader or elevating-runway F is preferably provided with a hinged door F', so that the cans may be discharged into the runway N at a lower point, if desired. The can loading or elevating runways F are adjustably mounted on the frame A, so that they may be adjusted to or from the belt G to regulate the grip of the belt against the cans. This adjustment is effected by adjusting-screws $f$. The inclined connecting-runways E are also adjustably connected to the frame A by adjusting-screws E'. A flexible strip of leather or canvas F², attached at one end to the elevating-runway F and at its opposite end to the chute or runway E, coöperates with the pulley $g$ of the belt G to deliver the cans from the runway E to the runway F and into the grip or bite of the belt G. One of these strips F² is provided for each of the chutes E and runways F.

The upper guides D', which coöperate with the belts D, are furnished with springs $d^2$ to cause the same to exert a yielding pressure against the cans being rolled beneath them by the belts D. The belts D travel in guideways D², preferably consisting of angle-bars, which are adjustable to and from each other to accommodate cans of different lengths. The can-runways F are each also preferably composed of angle-bars adjustable to and from each other to correspond to the length of the cans.

The elevating or loader belts G travel at a higher speed than the can-conveyer belts D to space the cans farther apart as they are rolled up the runway F, thus causing the belt G to have a better grip on each can.

I claim—

1. In a can counting and loading apparatus, the combination with a plurality of can-delivery runways, of a plurality of can-rolling belts, a plurality of guides above said can-rolling belts, a plurality of sets of counters having spiders or counter-wheels arranged in the path of the cans, a plurality of can loader or elevating belts for rolling the cans up said runways and a plurality of inclined chutes or runways for delivering the cans from the can-rolling belts of the counter mechanism to the elevating or loading can runways or belts, and means for driving said can loader or elevating belts at a higher speed than said can-rolling belts of the counter mechanism substantially as specified.

2. The combination with a horizontal guide beneath which the cans may be rolled, of a belt for rolling the cans under and along said guide, a counter having a spider or counter-wheel arranged in the path of the cans as they are rolled under said guide by said belt, substantially as specified.

3. In a can counting and loading apparatus, the combination with a plurality of can-delivering runways, of a plurality of can-rolling belts, a plurality of guides above said can-rolling belts, a plurality of sets of counters having spiders or counter-wheels arranged in the path of the cans, a plurality of can loading or elevating belts for rolling the cans up said runways, a plurality of can loader or elevating runways, a plurality of inclined chutes or runways for delivering the cans from the can-rolling belts of the counter mechanism to the elevating or loading can runways or belts, said can-elevating runways being curved or cambered toward said belts for rolling the cans up said runways, substantially as specified.

4. In a can counting and loading apparatus, the combination with a plurality of can-delivering runways, of a plurality of can-rolling belts, a plurality of guides above said can-rolling belts, a plurality of sets of counters having spiders or counter-wheels arranged in the path of the cans, a plurality of can loader or elevating belts for rolling the cans up said runways, a plurality of inclined chutes or runways for delivering the cans from the can-rolling belts of the counter mechanism to the elevating or loading can runways or belts, and springs acting against said guides to cause the same to exert a yielding pressure against the cans as they are rolled and conveyed beneath the same, substantially as specified.

5. In a can counting and loading apparatus, the combination with a plurality of can-delivering runways, of a plurality of can-rolling belts, a plurality of guides above said can-rolling belts, a plurality of sets of counters having spiders or counter-wheels arranged in the path of the cans, a plurality of can loader or elevating belts for rolling the cans up said runways, a plurality of inclined chutes or runways for delivering the cans from the can-rolling belts of the counter mechanism to the elevating or loading can runways or belts, and means for independently adjusting each of said can-elevating runways to and from its coöperating belt, substantially as specified.

JOHN G. HODGSON.

Witnesses:
H. M. MUNDAY,
EDMUND ADCOCK.